Dec. 9, 1952     T. C. TOMPERS     2,621,228
CABLE SPLICING SLEEVE WITH SEALING CHAMBERS
Filed Aug. 8, 1949
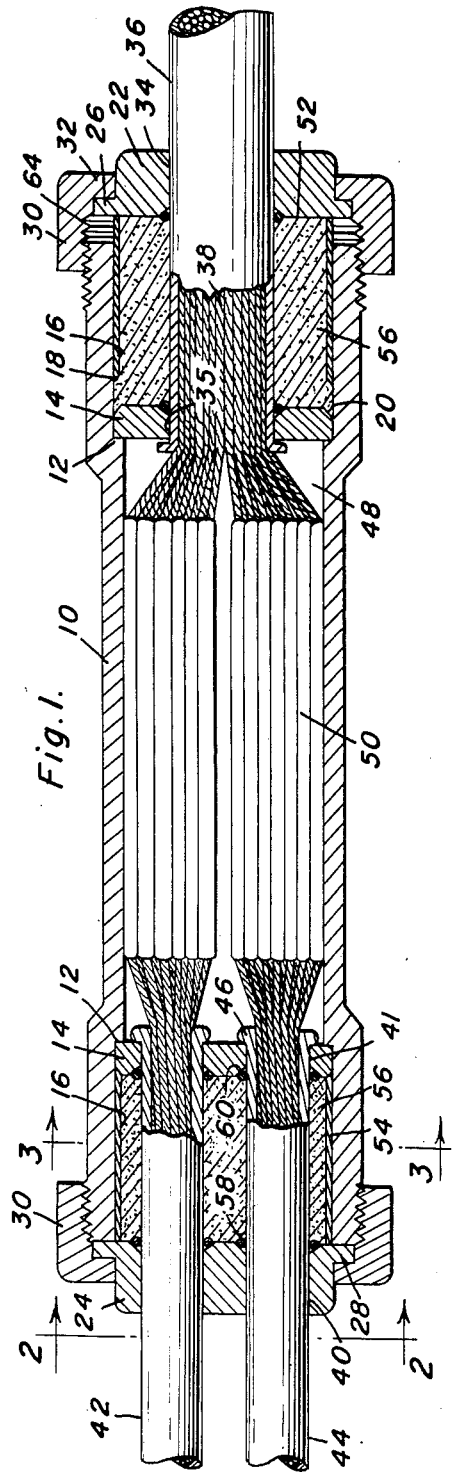
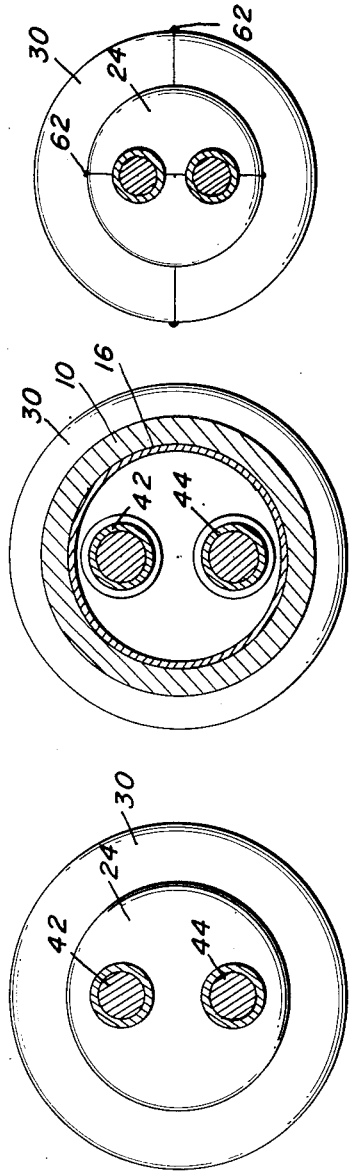
Theodore C. Tompers
INVENTOR.
BY *Clarence A. O'Brien*
*and Harvey B. Jacobson*
Attorneys Patented Dec. 9, 1952

2,621,228

UNITED STATES PATENT OFFICE 2,621,228

CABLE SPLICING SLEEVE WITH SEALING CHAMBERS

Theodore C. Tompers, Susanville, Calif.

Application August 8, 1949, Serial No. 109,193

2 Claims. (Cl. 174—93)

This invention relates to an improved cable splicing sleeve for the protection of sheathed electric conductors, wherein splices have been made.

The primary object of the present invention is to provide a splicing sleeve, which may be readily applied to metallic sheathed electric cables to prevent moisture gaining access to portions of the conductors from which sheathing has been removed during splicing operations.

Another important object is to provide a sleeve in accordance with the foregoing object that, in application, does not require the skill necessary or the hazards incident to the usual practice of wiping a joint.

Another important object of the present invention is to provide a device in conformity with the foregoing objects that may be readily removed for circuit testing or the like, and which will be low in cost, simple and easy to use, and be highly efficient for the purposes intended.

Important features of the present invention are the means for seating the sleeve, and the sliding sleeve for the reception and retention of sealing compound.

These, together with various ancillary features and objects of the invention which will later become apparent as the following description proceeds, are attained by the present invention, preferred embodiments of which have been illustrated by way of example only in the accompanying drawings, wherein:

Figure 1 is a central longitudinal sectional view of an application of the present invention showing the same used to shield a spliced juncture of a single cable and two other cables;

Figure 2 is a transverse sectional view taken through the pair of cables of Figure 1, being taken upon the plane of the section line 2—2 of Figure 1 and showing the end of the device proper;

Figure 3 is a transverse sectional view of the application shown in Figure 1 being taken upon the plane of the section line 3—3 of Figure 1; and Figure 4 is a view similar to the view in Figure 2, however showing the device as being split.

Reference is now made more specifically to the accompanying drawings, wherein like numerals designate similar parts throughout the various views, and in which the numeral 10 designates an open-ended barrel or casing. The opposite ends of the casing 10 are counterbored to provide internal shoulders 12 against which walls or disks 14 are seated, the latter being slidable in the ends of the casing 10. Slidably received in the ends of the casing 10 are sleeves 16, the inner ends of which are beveled, as at 18, for engagement with complementary beveled edges 20 of the walls 14.

The ends of the casing 10 are closed by caps 22 and 24, which are respectively provided with annular flanges 26 and 28. The caps 22 and 24 are retained against the sleeves 16 and the casing 10 by compression nuts 30 which have annular flanges 32 for engagement with the flanges 26 and 28, whereby the caps constitute movable walls for the casing.

The cap 22 and the adjacent wall 14 are provided with registering openings 34 and 35 which receive sheathing 36 of an electric cable having conductors 38 therein. Similarly, the cap 24 and its adjacent wall 14 are provided with openings 40 and 41 for the reception of cables 42 and 44.

It is clearly shown in Figure 1 that the sheathing for the cables terminates and is outturned to form a bead, as at 46, to seat against the walls 14, and that the conductors 38 extend into the space 48 between the walls 14, being spliced, as at 50, and divided so as to extend out the cables 42 and 44. It will be understood that although Figure 1 shows the splicing sleeve connecting two cables to a single cable, the present invention is applicable to any desired combination of a number of cables entering and leaving the splicing sleeve.

Between the caps 22 and 24 and their adjacent walls 14 are chambers 52 and 54, respectively, for the reception of sealing compound 56, which is any suitable plastic material that is impervious to water and which will not harden with age, numerous varieties of which are found on the open market.

The sealing compound 56 is prevented from leaking around the electric cables through the openings in caps 22 and 24 and walls 14 by the washers 58, which are preferably asbestos, that embrace the electric cables and for which the caps 22 and 24 and walls 14 are beveled to receive adjacent their openings, as at 60.

The modification shown in Figures 1, 2 and 3 illustrates an application wherein the casing 10, the walls 14, the caps 22 and 24, and the compression nuts 30 may be formed as desired of materials either metallic or plastic; however, Figure 4 illustrates a modification that will permit the splicing sleeve to be readily placed about electric cables, in which the casing 10 is preferably lead so as to be readily split and the walls 14 and caps 24 and 22 are in sections, preferably brass, which are joined by any suitable method, such as soldering 62. Therefore, it will be seen that the modification in Figure 4 shows a construction which will readily permit the splicing sleeve to be readily assembled or disassembled about the cables to be protected. It will be readily understood that the compression nuts 30 could be of any known type of sectional nut, instead of being simply split as shown in Figure 4.

The operation of the device will be readily understood. With the casing 10 around the spliced portion of the cable, and the walls 14 and the sleeve 16 and the caps 22 and 24 and nuts removed therefrom, the walls 14 will be placed against the shoulders 12 and the sleeve 16 partially inserted in the ends of the casing 10, whereupon sealing compound 56 is forced into the end of the sleeve 16. The insertion of sealing compound 56 into the chambers 52 and 54 with the sleeve 16 partially extended assures an ample quantity of sealing compound in the chambers, so that tightening of the nuts 30 will compress the sealing compound tightly about the electric cable to effect an efficient moisture seal. The compression nut 30, shown at the right side of the device as seen in Figure 1, shows the same in the process of being tightened to compress the sealing compound 56 in the chamber 52, as before mentioned. It will be understood that when the sleeves 16 are fully inserted in the ends of the casing 10 so as to engage the walls 14, the beveled edges 18 of the sleeves 16 will cause the ends of the sleeves 16 to expand slightly so as to tightly engage the casing 10. It is to be noted that during the process of tightening the nuts 30 that the sleeves 16 prevent sealing compound from entering the internal threads 64, thus assuring easy removal of the nuts 30 at a future time.

Although the present invention will probably find its greatest application with electric cables that are lead-sheathed, it will be understood that the principles of the invention may equally be as well applied to electrical conductors of the type having plastic, rubber, and other metals as well as lead. This is because the sheathing is subjected to no compressive forces other than that of washers 58 and the evenly distributed pressure exerted by the sealing compound 56.

From the foregoing, the construction and operation of the device wil be readily understood and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having described the invention, what is claimed as new is:

1. A cable splice sleeve comprising a tubular casing having a cable passage therethrough, internal shoulders spaced from each end of said casing, inner walls seated on said shoulders, the outer peripheral edge of said walls being beveled, tubular sleeves slidably received in the ends of said casing, the inner ends of said sleeves being beveled complementary to the beveled edges of said walls, closure caps for the ends of said casing, compression nuts engaging said caps, each cap and the adjacent inner wall having registering cable openings therein, a cable extending through said openings, said cables sealing said openings, a quantity of plastic, water impervious sealing compound filling said ends and said sliding sleeves.

2. A cable splice sleeve comprising a tubular casing having a cable passage therethrough, internal shoulders spaced from each end of said casing, inner walls seated on said shoulders, the outer peripheral edge of said walls being beveled, tubular sleeves slidably received in the ends of said casing, the inner ends of said sleeves being beveled complementary to the beveled edges of said walls, closure caps for the ends of said casing, compression nuts engaging said caps, each cap and the adjacent inner wall having registering cable openings therein, a cable extending through said openings, said cable sealing said openings, a quantity of plastic, water impervious sealing compound filling said ends and said sliding sleeves, the edges of the cable openings in proximity to said sealing compound being beveled, sealing washers seated on said beveled edges.

THEODORE C. TOMPERS.

REFERENCES CITED

The following references are of record in the file of this patent:

UNITED STATES PATENTS

| Number | Name | Date |
|---|---|---|
| 488,027 | Purcell | Dec. 13, 1892 |
| 1,097,289 | Bierce | May 19, 1914 |
| 1,794,750 | Ainsworth | Mar. 3, 1931 |
| 1,811,334 | Roemer | June 23, 1931 |
| 1,996,565 | Boch | Apr. 2, 1935 |
| 2,139,125 | Hixon | Dec. 6, 1938 |
| 2,310,423 | Gold | Feb. 9, 1943 |
| 2,425,959 | Schoenborn | Aug. 19, 1947 |
| 499,603 | England | Jan. 26, 1939 |

FOREIGN PATENTS

| Number | Country | Date |
|---|---|---|